United States Patent [19]

Abel

[11] 4,341,656

[45] Jul. 27, 1982

[54] FOAM INHIBITORS AND THEIR USE FOR DEFOAMING AQUEOUS SYSTEMS

[75] Inventor: Heinz Abel, Reinach, Switzerland

[73] Assignee: Ciba-Geigy Corporation, Ardsley, N.Y.

[21] Appl. No.: 88,265

[22] Filed: Oct. 25, 1979

[30] Foreign Application Priority Data

Nov. 3, 1978 [CH] Switzerland .................. 11345/78

[51] Int. Cl.³ .................................................. B01D 19/04
[52] U.S. Cl. ...................................... 252/321; 252/99; 252/358
[58] Field of Search ............................ 252/321, 358

[56] References Cited

U.S. PATENT DOCUMENTS

| | | | |
|---|---|---|---|
| 1,947,725 | 2/1934 | MacArthur et al. | 252/321 |
| 1,957,513 | 5/1934 | Wolfson | 252/358 X |
| 3,076,768 | 2/1963 | Boylan | 252/358 |
| 3,492,242 | 1/1970 | Carney et al. | 252/358 |
| 3,657,136 | 4/1972 | Lieberman et al. | 252/321 |
| 3,751,373 | 8/1973 | Lieberman et al. | 252/321 |
| 3,869,412 | 3/1975 | Waag | 252/321 X |
| 3,920,559 | 11/1975 | Elting | 252/321 |

FOREIGN PATENT DOCUMENTS 1267482 3/1972 United Kingdom .
1402597 8/1975 United Kingdom .

OTHER PUBLICATIONS

Ross: "Chemical Antifoaming Agents", Chemical Industries, May 1949, pp. 757-759.

*Primary Examiner*—Richard D. Lovering
*Attorney, Agent, or Firm*—Edward McC. Roberts

[57] ABSTRACT

Foam inhibitors for aqueous systems which contain a fatty acid salt of a polyvalent metal, especially an alkaline earth metal or aluminium, an anionic surfactant or a non-ionic reaction product of an alcohol or an alkyl phenol with an alkylene oxide, an aliphatic alcohol of 5 to 18 carbon atoms or a mixture of such alcohols, and a hydrophobic organic solvent or solvent mixture; these foam inhibitors are stable, they are miscible to any extent with water or organic solvents and can be used e.g. for defoaming aqueous dyebaths, treatment baths, printing pastes, pulp suspensions, paints, detergent solutions or also wastewaters.

19 Claims, No Drawings

FOAM INHIBITORS AND THEIR USE FOR DEFOAMING AQUEOUS SYSTEMS

The present invention relates to foam inhibitors for aqueous systems which contain a fatty acid salt of a polyvalent metal, a surfactant, an aliphatic alcohol and a hydrophobic organic solvent, e.g. paraffin oil, and which are in the form of stable solutions.

It is already known to use metal salts of a fatty acid, e.g. aluminium stearate, in defoaming compositions. Such compositions which contain a water-insoluble metal salt, a dispersant, e.g. Turkey red oil, and an organic solvent, e.g. paraffin oil, are described in U.S. Pat. No. 1,957,513. These defoaming compositions are, on the one hand, not stable, i.e. they demix, and, on the other, they spread only slowly and incompletely onto the systems which it is desired to defoam, so that overall only an insignificant foam inhibition is obtained.

U.S. Pat. No. 3,492,242 describes a defoaming composition which contains aluminium stearate, a long chain alcohol and a fluid organic solvent, e.g. a fluid hydrocarbon. Upon addition of water, this composition forms an opaque emulsion which readily demixes, so that its foam inhibiting action is impaired.

The present invention has for its object the provision of foam inhibitors which are stable when stored, which do not demix even after addition of water, and which furthermore are miscible with water in any ratio.

It has now been found that mixtures of fatty acid salts of polyvalent metals, an anionic or non-ionic surfactant, an aliphatic alcohol and a hydrophobic organic solvent are very effective foam inhibitors for aqueous systems.

Accordingly, the present invention provides foam inhibitors for aqueous systems, said foam inhibitors containing (1) 1 to 10% by weight of a fatty acid salt of a polyvalent metal,
(2) 1 to 6% by weight of an anionic surfactant or of a non-ionic reaction product of an alcohol or alkylphenol with an alkylene oxide,
(3) 0.5 to 10% by weight of an aliphatic alcohol containing 5 to 18 carbon atoms or of a mixture of such alcohols, and
(4) 74 to 97.5% of a hydrophobic organic solvent or solvent mixture which is different from component (3).

The foam inhibitors of this invention differ in the composition of their components from the foam inhibitors of the prior art, they have a very good shelf life, and they are miscible with water, with the alcohols suitable for use as component (3) or with the hydrophobic organic solvents suitable for use as component (4) in any desired ratio, without subsequently demixing.

Further objects of the invention are concerned with the use of the novel foam inhibitors for defoaming aqueous systems, in particular baths and treatment liquors employed in the dyeing and finishing of textiles, with foam control in the manufacture and processing of paper and in wastewater purification, and also with their use as foam regulators, e.g. in detergents.

As component (1) in the foam inhibitors of the invention it is possible to use fatty acid salts of polyvalent metals, e.g. of magnesium, calcium, strontium, barium, zinc or aluminium. Fatty acid salts of alkaline earth metals, and especially of aluminium, are preferred. These salts can be salts of mono-, di- or tri-fatty acids and can be employed singly or in admixture. They should be in solid aggregate state at room temperature. Suitable fatty acids, which can be saturated or unsaturated, are those containing 8 to 22 carbon atoms, e.g. caprylic, pelargonic, capric, lauric, myristic, palmitic, stearic, arachinic, behenic, coconut fatty, tallow fatty, decenoic, linolic, linolenic, oleic, ricinolic, eicosenoic, docosenoic or clupadonic acid.

Preferred fatty acids are those containing 16 to 22 carbon atoms. The aluminium salts of these fatty acids, in particular aluminium stearate, are especially suitable. By aluminium stearate within the scope of the present invention is meant aluminium mono-, di- or tristearate or a mixture thereof.

If the surfactants of component (2) are anionic surfactants, they are preferably esterified alkylene oxide adducts, e.g. adducts containing acid ester groups of inorganic or organic acids of alkylene oxides, in particular ethylene oxide and/or propylene oxide, with organic hydroxyl, carboxyl, amino or amido compounds containing aliphatic hydrocarbon radicals having a total of at least 4, and preferably at least 8, carbon atoms, or mixtures thereof. These acid esters can be in the form of free acids or salts, e.g. alkali metal, alkaline earth metal, ammonium or amine salts.

These anionic surfactants are obtained by known methods by addition of at least 1 mole, preferably of more than 1 mole, e.g. 2 to 60 moles, of ethylene oxide or propylene oxide, or alternately, in any order, ethylene oxide and propylene oxide, to the above organic compounds, and subsequently etherifying or esterifying the adducts and, if desired, converting the ethers or esters into their salts. Suitable starting materials are e.g. higher fatty alcohols, i.e. alkanols or alkenols, each containing 8 to 22 carbon atoms, alicyclic alcohols, phenylphenols, benzylphenols, alkylphenols containing one or more alkyl substituents which together contain at least 4, and preferably at least 8, carbon atoms, or fatty acids which contain 8 to 22 carbon atoms.

Particularly suitable anionic surfactants have the formula

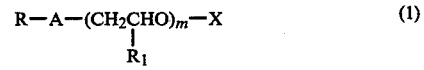
(1)

wherein R is an aliphatic hydrocarbon radical containing 8 to 22 carbon atoms or a cycloaliphatic, aromatic or aliphatic-aromatic hydrocarbon radical containing 10 to 22 carbon atoms, $R_1$ is hydrogen or methyl, A is

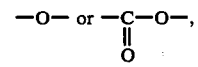

X is the acid radical of an inorganic oxygen-containing acid, the acid radical of a polybasic carboxylic acid or a carboxyalkyl radical, and m is an integer from 1 to 50.

The radical R-A in the compounds of the formula (1) is derived e.g. from higher alcohols, such as 2-ethylhexanol, decyl, lauryl, tridecyl, myristyl, cetyl, stearyl, oleyl, arachidyl or behenyl alcohol; from alicyclic alcohols, such as hydroabiethyl alcohol; from fatty acids, such as caprylic, capric, lauric, myristic, palmitic, stearic, arachinic, behenic, $C_1$-$C_{18}$ coconut fatty, decenoic, dodecenoic, tetradecenoic, hexadecenoic, oleic, linolic, linolenic, eicosenic, docosenoic or clupanodonic acid; from alkylphenols, such as butylphenol, hexylphenol, n-octylphenol, n-nonylphenol, p-tert-octylphenol, p- tert-nonylphenol, decylphenol, dodecylphenol, tetradecylphenol or hexadecylphenol, or from arylphenols, such as the o- or p-phenylphenols. Preferred radicals are those containing 10 to 18 carbon atoms, especially those which are derived from the alkylphenols.

The acid radical X is ordinarily the acid radical of a polybasic, in particular low molecular, mono- or dicarboxylic acid, e.g. of maleic acid, malonic acid, succinic acid or sulfosuccinic acid, or it is a carboxyalkyl radical, in particular a carboxymethyl radical (derived in particular from chloroacetic acid), and is bonded to the radical R—A—$(CH_2CHR_1O)_m$—through an ether or ester bridge. In particular, however, X is derived from an inorganic polybasic acid, such as orthophosphoric acid and sulfuric acid. The acid radical X exists preferably in salt form, i.e. for example in the form of an alkali metal salt, alkaline earth metal salt, ammonium or amine salt. Examples of such salts are sodium, calcium, ammonium, trimethylamine, ethanolamine, diethanolamine or triethanolamine salts. The alkylene oxide units $-(CH_2CHR_1O)-$ in formula (1) are normally ethylene oxide and 1,2-propylene oxide units. The latter are preferably in admixture with ethylene oxide units in the compounds of the formula (1).

Particularly interesting anionic compounds are those of the formula

  (2)

$$R_2O-(CH_2CH_2O)_{\overline{m}}X$$

wherein $R_2$ is a saturated or unsaturated aliphatic hydrocarbon radical containing 8 to 22 carbon atoms, o-phenylphenyl or alkylphenyl containing 4 to 12 carbon atoms in the alkyl moiety, and X and m have the given meanings.

Especially preferred compounds which are derived from alkylphenol/ethylene oxide adducts are also those of the formulae

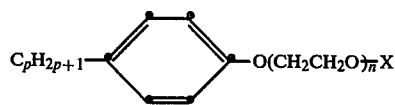  (3)

and

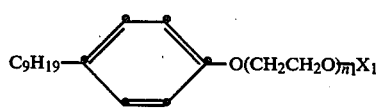  (4)

wherein p is an integer from 4 to 12, n is an integer from 1 to 20, $n_1$ is an integer from 1 to 10, $X_1$ is a phosphoric acid radical which can exist in salt form, and X has the given meaning.

Further anionic surfactants which can be used as component (2) are the adducts of 1 to 60 moles of ethylene oxide and/or propylene oxide with trihydric to hexahydric alkanols containing 3 to 6 carbon atoms, which adducts have been converted into an acid ester with a dicarboxylic acid, e.g. maleic acid, malonic acid or sulfosuccinic acid, but preferably with an inorganic polybasic acid, such as orthophosphoric acid or, in particular, sulfuric acid;

sulfated aliphatic alcohols containing 8 to 18 carbon atoms in the alkyl chain, e.g. sulfated lauryl alcohol;

sulfated unsaturated fatty acids or lower alkyl esters of fatty acids which contain 8 to 20 carbon atoms in the fatty acid radical, e.g. ricinolic acid and oils containing such fatty acids, e.g. castor oil;

sulfonates of polycarboxylic acid esters, e.g. dioctylsulfosuccinate;

alkylsulfonates which contain 8 to 20 carbon atoms in the alkyl chain, e.g. dodecylsulfonate; and in particular alkylarylsulfonates with straight or branched alkyl chain containing at least 6 carbo atoms, e.g. dodecylbenzenesulfonate or 3,7-diisobutylnaphthalenesulfonate.

If component (2) is a non-ionic reaction product of an alcohol or alkylphenol with an alkylene oxide, it is e.g. a reaction product of an aliphatic alcohol containing 4 to 22 carbon atoms with up to 80 moles of ethylene oxide and/or 1,2-propylene oxide.

The alcohols can preferably contain 4 to 18 carbon atoms, they can be branched or straight chain and they can be employed singly or in admixture.

It is possible to use natural alcohols, e.g. myristyl alcohol, cetyl alcohol, stearyl alcohol, oleyl alcohol, arachidyl alcohol or behenyl alcohol, or synthetic alcohols, in particular 2-butanol, n-butanol, isobutanol, 2-ethyl-hexanol, amyl alcohol, n-hexanol, trimethylhexanol, triethylhexanol, trimethylnonyl alcohol, or the ALFOL ® (registered trademark). The ALFOLS ® are linear primary alcohols. The number after the name indicates the average number of carbon atoms which the alcohol contains. Thus, for example, ALFOL ® (12–18) is a mixture of decyl, dodecyl, tetradecyl, hexadecyl and octadecyl alcohol. Further representatives are ALFOL ® (6–10), (8–10), (10–14), (12) (16), (18), and (20–22).

Preferred ethylene oxide/alcohol reaction products can be illustrated by the formula

  (5)

$$R_3O(CH_2CH_2O)_sH$$

wherein $R_3$ is a saturated or unsaturated aliphatic hydrocarbon radical, preferably an alkyl or alkenyl radical containing 8 to 18 carbon atoms, and s is an integer from 1 to 80, preferably from 1 to 30.

Also suitable for use as non-ionic component (2) are reaction products of ethylene oxide and/or 1,2-propylene oxide and alkylphenols containing 4 to 12 carbon atoms in the alkyl moiety, while the phenol can contain one or more alkyl substituents. Preferably these compounds have the formula

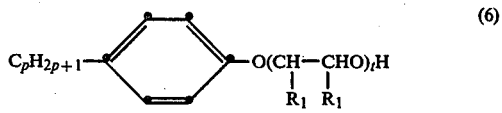  (6)

wherein $R_1$ is hydrogen or at most one of the two symbols $R_1$ is methyl, p is an integer from 4 to 12, preferably 8 or 9, and t is an integer from 1 to 60, in particular from 1 to 20 and preferably from 1 to 10.

At least one compound of component (2), or optionally a mixture of the above compounds, is used.

If desired, these adducts of an alcohol or alkylphenol with ethylene oxide and/or 1,2-propylene oxide can additionally contain smaller amounts of block polymers of the cited alkylene oxides.

Component (3) of the foam inhibitors of the present invention is an aliphatic alcohol containing 5 to 18 carbon atoms or a mixture of such alcohols. The alcohols can be straight chain or branched, saturated or unsaturated, and should normally be liquid at room temperature. Examples of such alcohols are: n-amyl alcohol, n-hexanol, trimethylhexanol, 2-ethyl-n-hexanol, octyl alcohol (octanol, mixture of isomers), nonyl alcohol, decyl alcohol, lauryl alcohol, tridecyl alcohol, myristyl alcohol, cetyl alcohol, stearyl or oleyl alcohol, and the ALFOLS®, e.g. ALFOL® (6–10), (8–10), (10–14), (12), (16), (18). Preferred alcohols are those containing 5 to 10 carbon atoms; 2-ethyl-n-hexanol is especially preferred.

Hydrophobic organic solvents which are employed as component (4), and which are different from component (3), are e.g. aliphatic or cycloaliphatic hydrocarbons, pine oil, dibutyl phthalate, dioctyl phthalate, butyl stearate, cyclohexyl acetate, benzyl acetate or phenyl acetate. These solvents should also be fluid at room temperature. Aliphatic hydrocarbons advantageously have an average molecular weight of 140 to 250 or are preferably paraffin oils with as low a pour point as possible (e.g. below −20° C.), a high boiling point (e.g. above 300° C.), and a low viscosity (e.g. 5 to 60 cS at 50° C.). Cycloaliphatic solvents are in particular cyclopentane, cyclohexane and decalin.

The pine oil which is also suitable as component (4) is a colourless to pale yellow liquid which is insoluble in water, but is soluble in organic solvents. Pine oil is obtained e.g. by distillation of the waste of different American pinewoods and contains at least 65% of terpene alcohols [Römpp, Chemie Lexikon, 2703, (1974)].

Preferred foam inhibitors contain
 (1) 1 to 10% by weight of an alkaline earth metal salt or aluminium salt of a fatty acid, wherein the fatty acid radical contains 8 to 22 carbon atoms,
 (2) 1 to 6% by weight of
  (a) an anionic surfactant of the formula (1) or
  (b) a non-ionic reaction product of an aliphatic alcohol containing 4 to 22 carbon atoms or of an alkylphenol containing 4 to 12 carbon atoms in the alkyl moiety with ethylene oxide and/or 1,2-propylene oxide,
 (3) 0.5 to 10% by weight of a straight-chain or branched, saturated or unsaturated aliphatic alcohol containing 5 to 18 carbon atoms or of a mixture of such alcohols, and
 (4) 74 to 97.5% by weight of an aliphatic or cycloaliphatic hydrocarbon or pine oil or of a mixture thereof.

Especially preferred foam inhibitors contain
 (1) 2 to 5% by weight of aluminium stearate or of a mixture of aluminium stearate and magnesium stearate,
 (2) 2 to 4% by weight of an acid phosphoric acid ester of the reaction product of nonylphenol and 10 moles of ethylene oxide,
 (3) 3 to 7% by weight of 2-ethyl-n-hexanol and
 (4) 84 to 93% by weight of paraffin oil.

The ratio of aluminium stearate to magnesium stearate can be e.g. 1:5 to 5:1. Foam inhibitors which contain these two salts are distinguished by the neutral reaction of their aqueous solutions.

The foam inhibitors of the present invention can be obtained by stirring components (1) to (4) at room temperature, heating the mixture, with further stirring, to a temperature ranging from 50° to 150° C., preferably from 80° to 110° C., for about 10 to 60 minutes, and then cooling to room temperature, affording a homogeneous, clear mixture which is stable at room temperaature. The foam inhibitors can be employed in acid or alkaline preparations (pH range from about 1 to 12) and in a wide temperature range, e.g. from 20° to 150° C., without losing their effectiveness. For use in actual practice they can be added to the aqueous systems undiluted or after dilution with organic solvents or water in amounts of about 0.001 to 50 g/l (kg), preferably 0.001 to 20 g/l (kg). Treatment baths for textiles can contain about 0.1 to 10 g/l, preferably 0.5 to 5 g/l. In wastewater purification, amounts of 0.001 to 1 g/l, preferably 0.001 to 0.1 g/l, will ordinarily be used. The amount depends also on the surfactants present in the wastewater or in the other aqueous systems.

If the foam inhibitors of the invention are used as foam regulators for detergents by incorporating them in aqueous pastes of the detergents or of individual constituents of the detergents, then up to 20 g of foam inhibitor per liter or kilogram of the aqueous paste can be used before drying this latter.

If desired, the foam inhibitors can also be employed in the form of dilute aqueous or organic preparations (solutions), e.g. in the form of 1 to 99% aqueous solutions or solutions in an organic solvent, e.g. 2-ethyl-n-hexanol or toluene or a solvent mixture. These dilute foam inhibitor preparations make it easier to control the rate of addition to e.g. printing pastes, dyebaths or wastewaters.

The foam inhibitors can be employed in the most diverse processes in which aqueous preparations which readily tend to foam are used, e.g.
 (a) dyeing wool with 1:1 or 1:2 metal complex dyes, acid or reactive dyes; exhaust or continuous dyeing processes for dyeing synthetic polyamide fibres with acid or disperse dyes; dyeing cellulose fibres with reactive and direct dyes; dyeing polyacrylonitrile fibres with cationic dyes;
 (b) finishing processes for textiles; shrinkproofing of wool and wool-containing blends, providing cellulosic fibre material with a flame-retardant and crease-resistant finish, providing different fibre substrates with an oil-, water- and dirt repellent finish, providing different fibre substrates with an antistatic finish and a soft handle, whitening different fibre substrates;
 (c) pulp and paper manufacture (pulp suspensions) or paper finishing, especially sizing paper with aqueous resin preparations or surface-coating paper;
 (d) defoaming wastewaters, especially those occurring in the manufacture of textiles, leather, paper and pulp, or in the manufacture of dyes and fluorescent whitening agents, such as dyehouse, bleaching plant or gelatin-containing wastewaters. In addition to the entrained or dissolved impurities they contain, communal or industrial wastewaters of the above kind usually also have the drawback that they foam strongly. This foaming can hinder processing in purification plants and the introduction of air in biological water treatment plants. It is therefore advantageous to add foam inhibitors to such wastewaters. In order to manage with very small amounts of such foam inhibitors on the one hand, and on the other not to diminish the efficiency of the water treatment plant, such a foam inhibitor must be very stable and as inert as possible. The foam inhibitors described herein fulfill these conditions in exceptional manner and are therefore particularly suitable for this use;

(e) as foam regulators for detergents or their components (manufacture of foam regulated detergents);

(f) as foam regulators in wash liquors for washing in domestic washing machines;

(g) for the production of non-foaming paint preparations.

When the foam inhibitors of this invention are used in textile dyeing and finishing processes, a good foam inhibition is obtained, even if other readily foaming assistants (surfactants) are concurrently used.

In the following Examples parts and percentages are by weight. The following reaction products are examples of component (2):

COMPONENT (2): (anionic surfactants)

$A_1$ the ammonium salt of the acid sulfuric acid ester of the adduct of 1 mole of ethylene oxide and 1 mole of ALFOL ® (10-14);

$A_2$ the ammonium salt of the acid sulfuric acid ester of the adduct of 1 mole of ethylene oxide and 1 mole of stearyl alcohol;

$A_3$ the ammonium salt of the acid sulfuric acid ester of the adduct of 1 mole of ethylene oxide and 1 mole of 2-ethyl-hexanol;

$A_4$ the ammonium salt of the acid sulfuric acid ester of the adduct of 35 moles of ethylene oxide and 1 mole of stearyl alcohol;

$A_5$ the ammonium salt of the acid sulfuric acid ester of the adduct of 3 moles of ethylene oxide and 1 mole of tridecyl alcohol;

$A_6$ the ammonium salt of the acid sulfuric acid ester of the adduct of 4 moles of ethylene oxide and 1 mole of hydroabietyl alcohol;

$A_7$ the ammonium salt of the acid sulfuric acid ester of the adduct of 3 moles of ethylene oxide and 1 mole of ALFOL ® (20-22);

$A_8$ the ammonium salt of the acid sulfuric acid ester of the adduct of 3 moles of ethylene oxide and 1 mole of lauryl alcohol;

$A_9$ the ammonium salt of the acid sulfuric acid ester of the adduct of 3 moles of ethylene oxide and 1 mole of butylphenol;

$A_{10}$ the ammonium salt of the acid sulfuric acid ester of the adduct of 5 moles of ethylene oxide and 1 mole of tributylphenol;

$A_{11}$ the ammonium salt of the acid sulfuric acid ester of the adduct of 2 moles of ethylene oxide and 1 mole of nonylphenol;

$A_{12}$ the ammonium salt of the acid sulfuric acid ester of the adduct of 10 moles of propylene oxide and 10 moles of ethylene oxide and 1 mole of nonylphenol;

$A_{13}$ the ammonium salt of the acid sulfuric acid ester of the adduct of 35 moles of ethylene oxide and 1 mole of nonylphenol;

$A_{14}$ the ammonium salt of the acid sulfuric acid ester of the adduct of 50 moles of ethylene oxide and 1 mole of nonylphenol;

$A_{15}$ the ammonium salt of the acid sulfuric acid ester of the adduct of 15 moles of propylene oxide and 1 mole of nonylphenol;

$A_{16}$ the ammonium salt of the acid sulfuric acid ester of the adduct of 6 moles of ethylene oxide and 1 mole of dodecylphenol;

$A_{17}$ the ammonium salt of the acid sulfuric acid ester of the adduct of 6 moles of ethylene oxide and 1 mole of pentadecylphenol;

$A_{18}$ the ammonium salt of the acid sulfuric acid ester of the adduct of 8 moles of ethylene oxide and 1 mole of o-phenylphenol;

$A_{19}$ the ammonium salt of the acid sulfuric acid ester of the adduct of 2 moles of ethylene oxide and 1 mole of coconut fatty acid;

$A_{20}$ the ammonium salt of the acid sulfuric acid ester of the adduct of 2 moles of propylene oxide and 1 mole of coconut fatty acid;

$A_{21}$ the sodium salt of the acid maleic acid ester of the adduct of 2 moles of ethylene oxide and 1 mole of p-nonylphenol;

$A_{22}$ the sodium salt of the acid monosulfosuccinic acid ester of the adduct of 2 moles of ethylene oxide and 1 mole of p-nonylphenol;

$A_{23}$ the ammonium salt of the acid phosphoric acid ester of the adduct of 2 moles of ethylene oxide and 1 mole of nonylphenol;

$A_{24}$ the acid phosphoric acid ester of the adduct of 10 moles of ethylene oxide and 1 mole of p-nonylphenol;

$A_{25}$ the sodium salt of the carboxymethyl ether of the adduct of 4 moles of ethylene oxide and 1 mole of octylphenol;

$A_{26}$ the di-($\beta$-hydroxyethyl)amine salt of the acid sulfuric acid ester of the adduct of 3 moles of ethylene oxide and 1 mole of lauryl alcohol;

$A_{27}$ the sodium salt of the acid sulfuric acid ester of the adduct of 2 moles of ethylene oxide and 1 mole of lauryl alcohol;

$A_{28}$ the sodium salt of the acid sulfuric acid ester of the adduct of 3 moles of ethylene oxide and 1 mole of lauryl alcohol;

$A_{29}$ the acid phosphoric acid ester of the adduct of 5 moles of ethylene oxide and 1 mole of 2-ethyl-n-hexanol.

COMPONENT (2): (NON-IONIC SURFACTANTS)

$B_1$ the reaction product of 3 moles of ethylene oxide and 1 mole of 2-ethyl-hexanol;

$B_2$ the reaction product of 5 moles of ethylene oxide and 1 mole of 2-ethyl-hexanol;

$B_3$ the reaction product of 3 moles of ethylene oxide and 1 mole of stearyl alcohol;

$B_4$ the reaction product of 9 moles of ethylene oxide and 1 mole of ALFOL ® (10-14);

$B_5$ the reaction product of 3 moles of ethylene oxide and 1 mole of hexadecyl alcohol;

$B_6$ the reaction product of 6 moles of ethylene oxide and 1 mole of oleyl alcohol;

$B_7$ the reaction product of 5 moles of ethylene oxide and 1 mole of tributylphenol;

$B_8$ the reaction product of 8 moles of ethylene oxide and 1 mole of octylphenol;

$B_9$ the reaction product of 9 moles of ethylene oxide and 1 mole of nonylphenol;

$B_{10}$ the reaction product of 4 moles of ethylene oxide and 1 mole of nonylphenol;

$B_{11}$ the reaction product of 6 moles of ethylene oxide and 1 mole of nonylphenol;

$B_{12}$ the reaction product of 9.5 moles of 1,2-propylene oxide and 9.5 moles of ethylene oxide and 1 mole of nonylphenol;

$B_{13}$ the reaction product of 9 moles of ethylene oxide and 7 moles of 1,2-propylene oxide and 1 mole of lauryl alcohol;

$B_{14}$ the reaction product of 12 moles of ethylene oxide and 12 moles of propylene oxide and 1 mole of $C_4$-$C_{18}$ fatty alcohol;

B$_{15}$ the reaction product of 80 moles of ethylene oxide and 1 mole of oleyl alcohol;

B$_{16}$ mixture of a reaction product of 12 moles of ethylene oxide and 12 moles of propylene oxide and 1 mole of a C$_4$-C$_{18}$ fatty alcohol and a poly)oxyethylene)$_{12}$-poly(oxypropylene)$_{12}$ block polymer;

B$_{17}$ the reaction product of 2 moles of ethylene oxide and 1 mole of p-octylphenol;

B$_{18}$ the reaction product of 5 moles of ethylene oxide and 5 moles of propylene oxide and 1 mole of AL-FOL ® (12-14).

EXAMPLE 1

In a stirred vessel equipped with anchor agitator and heatable by means of a double casing, 6 kg of 2-n-ethyl-hexanol, 3 kg of surfactant A$_{24}$ and 4 kg of aluminium distearate are heated to 110° C. with continual stirring. Then 87 g of paraffin oil are added and the mixture is stirred for a further hour at 110° C., then allowed to cool to room temperature in the course of 1 hour, affording 100 kg of stable foam inhibitor.

Instead of using 2-ethyl-hexanol, it is also possible to use an equal amount of n-amyl alcohol, n-hexanol, trimethylhexanol, n-octanol, n-decanol or a mixture thereof. Pine oil can also be used instead of paraffin oil. Instead of using A$_{24}$, it is also possible to use equal amounts of the other reaction products designated by A or B.

EXAMPLE 2

A strongly foaming industrial wastewater having a surface tension of 40.5 dyn/cm is sprayed in an activated sludge tank with a 0.01% dilution of the foam inhibitor of Example 1. The amount added is such that 5 ppm is used for the entire amount of wastewater. The foam inhibitor makes it possible to keep the height of the foam on the wastewater constant at about 10 to 20 cm. Without the addition of the foam inhibitor, the foam formation is so great that the tank foams over after about 30 to 60 minutes.

It is to be noted in addition that the strong foam formation is greatly promoted by the entrainment of air caused by a large agitator. This entrainment of air is necessary, however, to make possible the degradation of ballast materials.

EXAMPLE 3

In a glass beaker, 15 ppm of sodium dodecylbenzenesulfonate are added to 1000 ccm of water of 20°-25° C. and then the mixture is made to foam with the aid of a mixer and by blowing in air (32 liters of air per hour). A foam height of 10 cm is obtained after 5 minutes. Then 3 ppm of the foam inhibitor of Example 1 are added after it has been diluted with water to 1:100. After 2 seconds the foam is completely eliminated. No fresh foam formation is observed even after further mixing and blowing in air for 30 minutes. If the test is carried out in the same manner, but without the addition of a foam inhibitor, then the foam rises to a height of over 15 cm. The use of a conventional foam inhibitor, e.g. one based on silicone oil, on the one hand requires 10 to 20 times the amount to eliminate the foam, and on the other hand, fresh foam formation occurs after a few minutes.

EXAMPLE 4

100 kg of cotton jersey are wetted in a concentrated bath jet dyeing machine in 600 liters of permutite water. To the bath are then added 36 g of sodium chloride, 5 kg of the dye of the formula

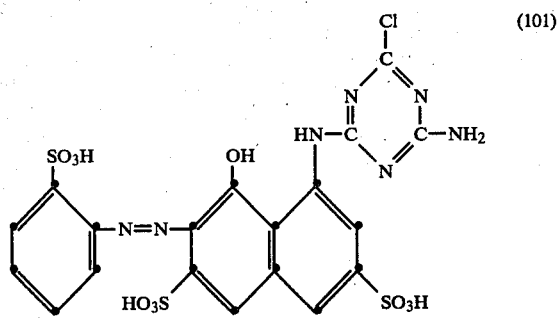

(101)

and 0.3 kg of the foam inhibitor of Example 1, diluted with water to 1:100. Dyeing is carried out in the jet for 45 minutes at 40° C. Then 0.6 kg of calcined sodium carbonate is added, followed by the addition of 1.2 kg of aqueous sodium hydroxide solution (36%) after 5 minutes. A fast, level red dyeing is obtained. No hindrance to the passage of the goods occurs during the dyeing procedure. Dyeing in the same bath without foam inhibitor results in hindrance to the passage of the goods because of foam formation.

EXAMPLE 5

100 kg of cotton jersey are dyed as described in Example 4, the following components being added to the bath: 3 kg of the dye of the formula

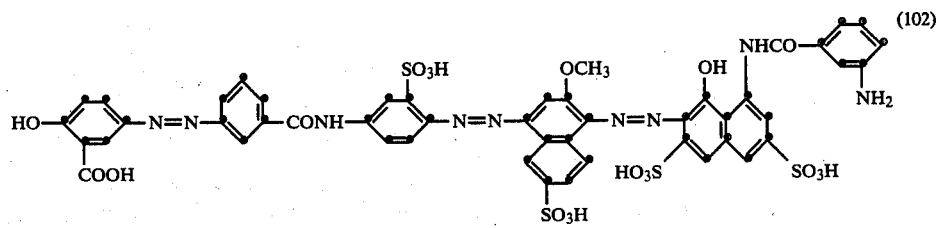

(102)

12 kg of sodium chloride and 0.5 kg of the foam inhibitor of Example 1. The dye is added to the bath at 50° C., the temperature is raised to 80° C. in the course of 30 minutes and dyeing is carried out at this temperature. One half of the indicated amount of salt (NaCl) is added after 5 minutes and the other half after 15 minutes. Dyeing is complete after a further 30 minutes at 80° C. and the fabric is rinsed. A level green dyeing is obtained. The passage of the goods is not hindered.

EXAMPLE 6

100 kg of cotton jersey are dyed as described in Example 4, the following components being added to the bath: 4 kg of the dye of the formula

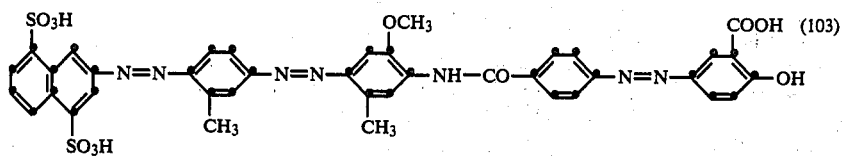

0.3 kg of calcined sodium carbonate, 12 kg of sodium chloride, 1.2 kg of copper sulfate and 1 kg of acetic acid (80%). After wetting the fabric at 50° C., the dye and the sodium carbonate are added to the bath, which is then heated in the course of 30 minutes to 80° C. One half of the sodium chloride is added after 5 minutes and the other half after 15 minutes. Dyeing is subsequently carried out for 30 minutes at 80° C. The goods are then rinsed and a fresh bath is prepared at 40° C. with copper sulfate and acetic acid. The fabric is aftertreated in this bath, which is heated to 70° C., for 30 minutes. At the conclusion of the treatment the goods are rinsed cold, wrung out, and dried. A level, fast dyeing is obtained. The passage of the goods is not hindered by foam formation.

EXAMPLE 7

In a beam dyeing machine, 100 kg of polyester jersey are wetted in 1000 liters of water of 70° C. Then 2 kg of ammonium sulfate and 4 kg of the dye of the formula

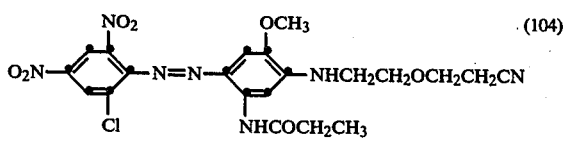

are added and the pH of the bath is adjusted with formic acid to 5.5. Then 0.8 kg of the foam inhibitor of Example 1 is added. The bath is heated to 130° C. and dyeing is carried out at this temperature for 60 minutes. The bath is then cooled and the goods are given a reductive after-clear in an alkaline bath in the conventional manner, then rinsed, wrung out, and dried. A level, speck-free dyeing is obtained. Dyeing without addition of the foam inhibitor results in the entrainment of air, which leads to the formation of specks on the fabric.

EXAMPLE 8

In a single-tier hank dyeing machine, 100 kg of polyacrylonitrile high-bulk yarn are first shrunk in 2000 liters of water at 90° C., then cooled to 60° C. The following components are then added to the bath: 1.5 g of the dye of the formula

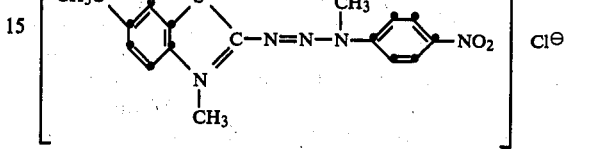

0.13 g of the dye of the formula

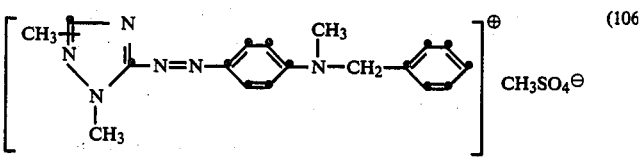

0.5 kg of the dye of the formula

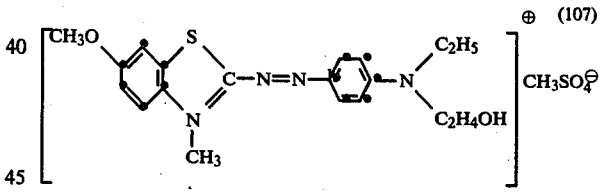

2 kg of 80% acetic acid, 10 kg of calcined sodium sulfate and 0.3 kg of the foam inhibitor of Example 1. After all the components have been homogenised, the bath is heated to boiling temperature in the course of 45 minutes and dyeing is carried out for 60 minutes at this temperature. The bath is subsequently cooled and the goods are rinsed, wrung out and dried. The yarn is dyed in a level and fast shade. Dyeing without addition of the foam inhibitor results in flecked dyeings caused by channel formation and entrained air.

EXAMPLE 9

It is unavoidable in textile printing that, when stirring printing pastes, air in the form of microfoam is entrained. This affects the print quality and, in particular, also the reproducibility of the prints. The entrainment of air can be completely avoided by preparing a printing paste as follows:

With continuous stirring, the following components are mixed together in a stirred vessel which is initially charged with 406 g of boiling water: 20 g of the dye of the formula

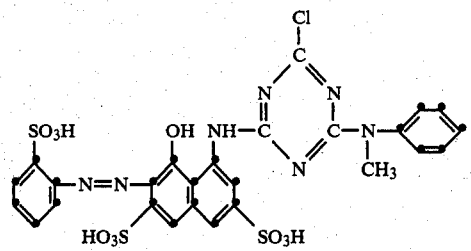

(108)

and then, after the dye has dissolved

```
100 g  of urea
 10 g  of the sodium salt of m-nitrobenzenesulfonic acid
  4 g  of the foam inhibitor of Example 1
400 g  of alginate thickening
 60 g  of sodium carbonate
1000 g of printing paste.
```

The printing paste contains no entrained air. This can be verified e.g. as follows:
1. by microscopic examination
2. by comparing the volume directly after stirring and after leaving the printing paste to stand for 24 hours in a closed container
3. by the weighing method described below.

WEIGHING METHOD

Exactly 25 ccm of each of the printing pastes obtained after stirring and after storage for 24 hours respectively are put into a balanced weighing pan, dried to constant weight and weighed. The amount of previously entrained air can be calculated from the difference in weight.

Percentage of entrained air $$V_1 = \frac{(A_{II} - A_I) \cdot 100}{A_{II}}$$

$A_{II}$ = weight of the sample stored for 24 hours
$A_I$ = weight of the sample directly after stirring
$V_I$ = entrained air in %

In this Example, the volume of the sample obtained directly after stirring corresponds exactly to the volume of the sample stored for 24 hours. The weighing method also gave the same weight.

If the test is carried out without the foam inhibitor, then the volume of the sample obtained directly after stirring is 25% greater than that of the sample stored for 24 hours and the weighed sample also contains 25% of entrained air.

The printing paste of this Example is used in the conventional manner for printing cotton fabric. The colour yield is about 25% greater than that obtained with the same printing paste which does not contain foam inhibitor. In addition, the print is smoother and more level.

Similar results are obtained by using a semi-emulsion thickening instead of alginate thickening. The thickenings have the following compositions:

ALGINATE THICKENING

```
  70 g  of sodium alginate
   5 g  of sodium tetrametaphosphate and sodium hexameta-
         phosphate
 925 g  of water
1000 g  of sodium alginate thickening
```

SEMI-EMULSION THICKENING

```
  50 g  of the reaction product of oleyl alcohol and 80 moles
         of ethylene oxide (12.5%, aqueous)
 150 g  of water
 400 g  of white spirit
 400 g  of 5% aqueous sodium alginate thickening (as indicated)
1000 g  of semi-emulsion thickening
```

EXAMPLE 10

A printing paste for printing polyester woven fabric by the thermofix process is prepared as follows:

With continuous stirring, 920 g of stock thickening and 80 g of the dye of the formula

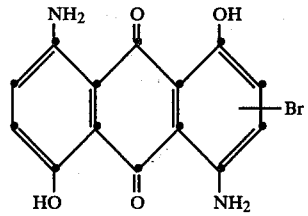

(109)

are mixed together. The composition of the stock thickening is as follows:

```
 500 g  of alginate thickening (5%)
 470 g  of water
   5 g  of 50% aqueous tartaric acid solution
   5 g  of foam inhibitor of Example 1
  20 g  of the reaction product of octadecyl alcohol and 35 moles
         of ethylene oxide (25%, aqueous)
1000 g  of stock thickening
```

This printing paste also contains no entrained air. Without foam inhibitor, it contains 15% of entrained air and the colour yield is correspondingly 15% lower when printing textile material. Furthermore, the resulting print is unlevel.

EXAMPLE 11

280 g of water are mixed with 16 g of the foam inhibitor of Example 1 to form an emulsion. With continuous stirring, 704 g of sodium bicarbonate are added and a homogeneous paste is obtained. The water is removed by vacuum distillation, affording 720 g of a colourless powder which can be used as a foam inhibiting neutraliser e.g. for acid baths or wastewaters.

EXAMPLE 12

(a) In a heatable stirred vessel, 370 g of water and 20 g of the foam inhibitor of Example 1 are homogenised. Then 610 g of potassium dihydrogen pyrophosphate are added and the mixture is stirred to a homogeneous slurry. The mixture is subsequently heated and the water is removed by vacuum distillation with continuous stirring. A dry, odourless powder is obtained in quantitative yield.

(b) The above powder is used to prepare a foam regulating detergent which has the following composition:

- 10% of dodecylbenzenesulfonate
- 5% of tallow alcohol ethoxylate [R—(OCH$_2$CH$_2$)$_{25}$OH]
- 30% of potassium dihydrogen pyrophosphate
- 10% of the preparation of (a)
- 35% of sodium perborate
- 0.1% of the fluorescent whitening agent of the formula (110)

$$\text{Ph-CH=CH-Ph-Ph-CH=CH-Ph}$$
$$SO_3Na \qquad\qquad\qquad SO_3Na$$

- 1.5% of carboxymethylcellulose
- 2.4% of sodium silicate
- 0.2% of magnesium silicate
- 0.8% of ethylenediaminetetracetic acid
- 5% of sodium sulfate
- 100% of detergent The constituents are homogenised in an appropriate mixing device.

(c) Comparison foam test in accordance with DIN 53 902. Amount of detergent employed: 10 g/l.

Test results:

| Detergent | Foam formation (ml of foam) 1 minute | 5 minutes |
|---|---|---|
| detergent of (b) | 10 | 10 |
| detergent of (b) without the addition of preparation (a) | 650 | 390 |
| detergent of (b) but with only 5% of preparation (a) | 60 | 10 |

Instead of potassium dihydrogen pyrophosphate, it is also possible to treat the sodium perborate or sodium sulfate or also the whole detergent as described in (a), in which case comparable results are obtained. However, treatment of the entire detergent is generally less economic than treatment of the constituents of the detergent.

EXAMPLE 13

A stirred vessel equipped with anchor agitator is charged with the individual components in the following order to produce a white disperse paint for interior and exterior painting.

| | |
|---|---|
| 72.5 g | of 1,2-propylene glycol |
| 560 g | of aqueous polyacrylate solution (50%) |
| 6 g | of foam inhibitor of Example 1 |
| 240 g | of titanium dioxide |
| 2 g | of 25% ammonia (aqueous) |
| 20 g | of benzyl acetate |
| 99.5 g | of water |
| 1000 g | of paint |

The deaeration action can be demonstrated by applying comparison coatings with a polyurethane paint roller to a previously painted and dried non-absorbent substrate. With the paint prepared in accordance with this Example there is markedly less foam formation than when using a paint prepared without foam inhibitor. This has a positive effective on the evenness of the coating (no pitting).

EXAMPLE 14

A heatable stirred vessel is charged with 1.3 kg of water and heated to 96° C. Simultaneously 0.2 kg of starch, 1 kg of kaolin, 10 g of foam inhibitor of Example 1 and 50 g of a methylolmelamine methyl ether (75% aqueous solution) are added. The mixture is stirred for 30 minutes at 96° C. and then cooled to room temperature with continuous stirring, affording 2555 g of a coating paste for paper coating. Verification by methods described in Example 9 shows that the paste contains only 2.5% of entrained air. A coating paste prepared without foam inhibitor contains 7.5% of entrained air.

EXAMPLE 15

(a) A foam inhibitor of the following composition is prepared in accordance with Example 1: 1% of magnesium stearate, 4% of aluminium stearate, 86% of paraffin oil, 3% of the surfactant A$_{23}$, 6% of 2-ethyl-n-hexanol. Aqueous solutions of this foam inhibitor are neutral, e.g. 1 to 99% solutions (pH 6.9), and accordingly do not have a corrosive action. In addition, they have a very good shelf life. A solution of 80 parts of this foam inhibitor and 20 parts of water can be used e.g. with the same good results as those described in Examples 2 to 14.

(b) By diluting the foam inhibitor of Example 1 with an organic solvent, e.g. 2-ethyl-n-hexanol or toluene, foam inhibitor compositions are obtained the addition of which can be more easily controlled for certain uses, e.g. in printing pastes. Such a composition contains e.g. 80 parts of 2-ethyl-n-hexanol and 20 parts of the foam inhibitor of Example 1.

In Examples 2 to 15, the same amount of each of the following foam inhibitors can be used instead of the foam inhibitor of Example 1 with equally good results:

(1) foam inhibitor consisting of
  5% of aluminium distearate
  3% of component A$_{24}$
  6% of ALFOL ® (6–10)
  20% of an aliphatic hydrocarbon having an average molecular weight of 170
  66% of aliphatic paraffin oil;

(2) foam inhibitor consisting of
  4% of aluminium tristearate
  3% of sodium dodecylbenzenesulfonate
  10% of octanol (mixture of isomers)
  10% of pine oil
  73% of aliphatic paraffin oil;

(3) foam inhibitor consisting of
  6% of aluminium tristearate
  3% of component B$_{18}$
  3% of amyl alcohol
  88% of paraffin oil;

(4) foam inhibitor consisting of
  4% of aluminium monostearate
  3% of component B$_{11}$
  5% of trimethylhexanol
  5% of 2-butanol
  10% of an aliphatic hydrocarbon (molecular weight 170)
  73% of aliphatic paraffin oil;

(5) foam inhibitor consisting of
  5% of aluminium distearate
  4% of component B$_{10}$
  3% of component A$_{24}$ 88% of aliphatic paraffin oil;
(6) foam inhibitor consisting of
3% of aluminium distearate
3% of sodium dodecylbenzenesulfonate
4% of ALFOL ® (6-10)
4% of stearyl alcohol
10% of decalin
76% of aliphatic paraffin oil;
(7) foam inhibitor consisting of
4% of aluminium distearate
6% of sodium dodecylbenzenesulfonate
10% of amyl alcohol
80% of aliphatic paraffin oil;
(8) foam inhibitor consisting of
10% of aluminium tristearate
3% of component $A_{24}$
6% of ALFOL ® (6-10)
81% of aliphatic paraffin oil;
(9) foam inhibitor consisting of
1% of aluminium distearate
1% of component $A_{24}$
1% of component $B_9$
10% of 2-butanol
87% of aliphatic paraffin oil;
(10) foam inhibitor consisting of
3% of aluminium distearate
6% of component $B_8$
0.5% of ALFOL ® (6-10)
10% of dibutylphosphate
80.5% of aliphatic paraffin oil;
(11) foam inhibitor consisting of
18% of foam inhibitor of Example 1
82% of an aliphatic hydrocarbon (molecular weight 170).

I claim:

1. A foam inhibitor for aqueous systems which comprises
   (1) 1 to 10% by weight of a fatty acid salt of a polyvalent metal,
   (2) 1 to 6% by weight of an anionic surfactant or of a non-ionic reaction product of an alcohol or alkylphenol with an alkylene oxide,
   (3) 0.5 to 10% by weight of an aliphatic alcohol of 5 to 10 carbon atoms or of a mixture of such alcohols, and
   (4) 74 to 97.5% of a hydrophobic organic solvent or solvent mixture which is different from component (3).

2. A foam inhibitor according to claim 1, which comprises
   (1) 1 to 10% by weight of an alkaline earth metal salt or aluminium salt of a fatty acid, wherein the fatty acid radical contains 8 to 22 carbon atoms,
   (2) 1 to 6% by weight of
      (a) an anionic surfactant of the formula $$R-A-(CH_2CHO)_m-X \quad (1)$$
$$\phantom{R-A-(CH_2C}|\phantom{O)_m-X}$$
$$\phantom{R-A-(CH_2CH}R_1$$

wherein R is an aliphatic hydrocarbon radical of 8 to 22 carbon atoms or a cycloaliphatic, aromatic or aliphatic-aromatic hydrocarbon radical, each of 10 to 22 carbon atoms, $R_1$ is hydrogen or methyl, A is $$-O- \text{ or } -\underset{\underset{O}{\|}}{C}-O-,$$

X is the acid radical of an inorganic oxygen-containing acid, the acid radical of a polybasic carboxylic acid or a carboxyalkyl radical, and m is 1 to 50, or
      (b) a non-ionic reaction product of an aliphatic alcohol of 4 to 22 carbon atoms or of an alkylphenol containing 4 to 12 carbon atoms in the alkyl moiety with ethylene oxide, 1,2-propylene oxide, or a mixture of these oxides,
   (3) 0.5 to 10% by weight of a straight-chain or branched, saturated or unsaturated aliphatic alcohol of 5 to 10 carbon atoms or of a mixture of such alcohols and
   (4) 74 to 97.5% by weight of an aliphatic or cycloaliphatic hydrocarbon or pine oil or of a mixture thereof.

3. A foam inhibitor according to claim 2, wherein component (2) is an anionic surfactant of the formula $$R_2O-(CH_2CH_2O)_{\overline{m}}X \quad (2)$$

wherein $R_2$ is a saturated or unsaturated aliphatic hydrocarbon radical of 8 to 22 carbon atoms, o-phenylphenyl or alkylphenyl containing 4 to 12 carbons in the alkyl moiety, and X and m have the meaning given in claim 2.

4. A foam inhibitor according to claim 2, wherein component (2) is a compound of the formula

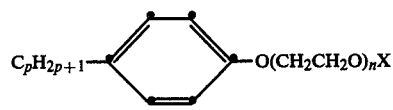

(3)

wherein p is 4 to 12, n is 1 to 20, and X is as defined in claim 2.

5. A foam inhibitor according to claim 7, wherein component (2) is a compound of the formula

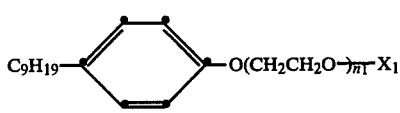

(4)

wherein $n_1$ is 1 to 10 and $X_1$ is a phosphoric acid radical.

6. A foam inhibitor according to claim 2, wherein component (2) is a compound of the formula $$R_3O(CH_2CH_2O)_sH \quad (5)$$

wherein $R_3$ is alkyl or alkenyl of 8 to 18 carbon atoms and s is 1 to 80.

7. A foam inhibitor according to claim 2, wherein component (2) is a compound of the formula

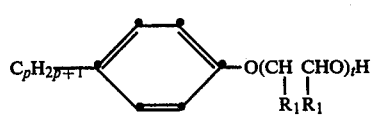

(6)

wherein $R_1$ is hydrogen or at most one of the two substitutents $R_1$ is methyl, p is 4 to 12 and t is 1 to 60.

8. A foam inhibitor according to claim 1, wherein component (1) is a magnesium, calcium, strontium, barium or aluminium salt of a fatty acid of 8 to 22 carbon atoms.

9. A foam inhibitor according to claim 8, wherein component (1) is the aluminium salt of a saturated fatty acid of 16 to 22 carbon atoms.

10. A foam inhibitor according to claim 9, wherein component (1) is aluminium stearate.

11. A foam inhibitor according to claim 1, wherein component (3) is n-amyl alcohol, n-hexanol, trimethylhexanol, 2-ethyl-n-hexanol, octyl alcohol, nonyl alcohol, decyl alcohol, or the ALFOLS ®, or a mixture of at least two of these alcohols.

12. A foam inhibitor according to claim 1, wherein component (4) is an aliphatic or cycloaliphatic hydrocarbon, pine oil, dibutyl phthalate, dioctylphthalate, butylstearate, cyclohexyl acetate, benzyl acetate or phenyl acetate or a mixture of at least two of these substances.

13. A foam inhibitor according to claim 1, wherein component (4) is paraffin oil, cyclopentane, cyclohexane, decalin, pine oil or a mixture of at least two of these substances.

14. A foam inhibitor according to claim 1, which comprises (1) 2 to 5% by weight of aluminium stearate or a mixture of aluminium stearate and magnesium stearate,
(2) 2 to 4% by weight of an acid phosphoric acid ester of the reaction product of nonylphenol and 10 moles of ethylene oxide,
(3) 3 to 7% by weight of 2-ethyl-n-hexanol and
(4) 84 to 93% by weight of paraffin oil.

15. A foam inhibitor preparation diluted with water or an organic solvent and containing 1 to 99% of the foam inhibitor as claimed in claim 1 and 99 to 1% of water or an organic solvent.

16. A foam inhibitor preparation according to claim 15, wherein the organic solvent is 2-ethyl-n-hexanol or toluene.

17. A method of defoaming aqueous systems, which comprises treating said systems with a foam inhibitor as claimed in claim 1 or with a foam inhibitor preparation as claimed in claim 15.

18. A method according to claim 17, wherein the aqueous systems to be defoamed are dyebaths, treatment baths or printing pastes for textile, pulp suspensions for paper manufacture, paints, detergent solutions, or wastewaters.

19. A method according to claim 18, wherein the aqueous systems to be defoamed are wastewaters which occur in the textile, leather, paper or pulp industry, or in the production of dyes or fluorescent whitening agents.

* * * * *